Aug. 20, 1946.   H. MORGENROTH   2,406,240
LIQUID METERING AND DISTRIBUTING APPARATUS
Filed May 3, 1943   2 Sheets-Sheet 1

Inventor
Henri Morgenroth
By Lyon & Lyon
Attorneys

Aug. 20, 1946.   H. MORGENROTH   2,406,240
LIQUID METERING AND DISTRIBUTING APPARATUS
Filed May 3, 1943   2 Sheets-Sheet 2

Inventor
Henri Morgenroth
By Lyon & Lyon
Attorneys

Patented Aug. 20, 1946

2,406,240

UNITED STATES PATENT OFFICE 2,406,240

LIQUID METERING AND DISTRIBUTING APPARATUS

Henri Morgenroth, Los Angeles, Calif.

Application May 3, 1943, Serial No. 485,463

11 Claims. (Cl. 222—250)

This invention relates to liquid metering and distributing apparatus, and an object of the invention is to provide apparatus of this type, which is capable of supplying equal quantities of liquid to a plurality of points of consumption, for example, the injectors of internal combustion engines, while providing means for regulating at will, the quantity of liquid distributed to each point of consumption, or injection nozzle.

Another object of the invention is to provide apparatus of this kind, which is simple and compact in construction, but which is capable of serving a considerable number of points of consumption for the liquid, and at the same time, providing simple means for enabling adjustments to be made at will, for regulating the quantity of liquid that is passed to each point of consumption while insuring that these quantities will be maintained equal at all times.

Another object of the invention is to provide a rotary part or rotor with a plurality of metering chambers, and mounted in a fixed casing or stator, means being provided for effecting the simultaneous regulation of the capacity of the metering chambers, while providing for the distribution of the equal charges from the metering chambers to a plurality of points of consumption such as the injection nozzles of an internal combustion engine.

In its preferred embodiment, this invention employs a plurality of metering chambers with which cooperate movable means for effecting the filling and discharge of the metering chambers at a rapid rate; and one of the objects of the invention is to provide simple means for housing these metering chambers in such a way as to utilize the pressure of the liquid under pressure, which is being distributed, to assist the filling and discharge of the metering chambers; also to construct the apparatus with simple means for effecting the regulation simultaneously of the capacity of the metering chambers.

Other objects of the invention will appear hereinafter.

The invention consists in the novel parts and combination of parts to be described hereinafter, all of which contribute to produce an efficient liquid metering and distributing apparatus.

A preferred embodiment of the invention is described in the following specification, while the broad scope of the invention is pointed out in the appended claims.

In the drawings:

Figs. 1 and 2 illustrate the same means and relation of parts for enabling simultaneous regulation of the capacity of the metering chambers to be effected.

Figure 1:
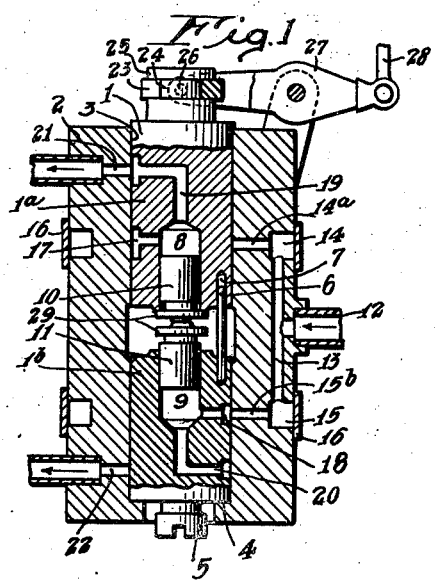
Fig. 1 is a vertical section through a device embodying my invention, certain parts being broken away and others shown in partial elevation. This view illustrates a simple embodiment of the invention in which only two metering chambers are employed which are located in axial alignment with each other on the axis of rotation of the rotor in which they are formed.
Figure 6:
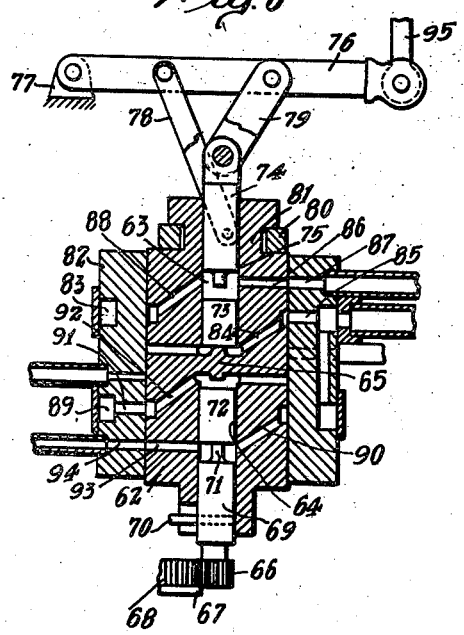

Fig. 6 is also a vertical section illustrating an embodiment of my invention which resembles Fig. 1, in that two metering chambers are employed in the rotor in axial alignment with each other; but in the embodiment shown in Fig. 6, the capacity of the metering chambers is controlled by effecting a longitudinal shifting movement of both the rotor and a stop that controls the amount of movement of the movable members or plungers associated with the metering chambers.

Figure 2:
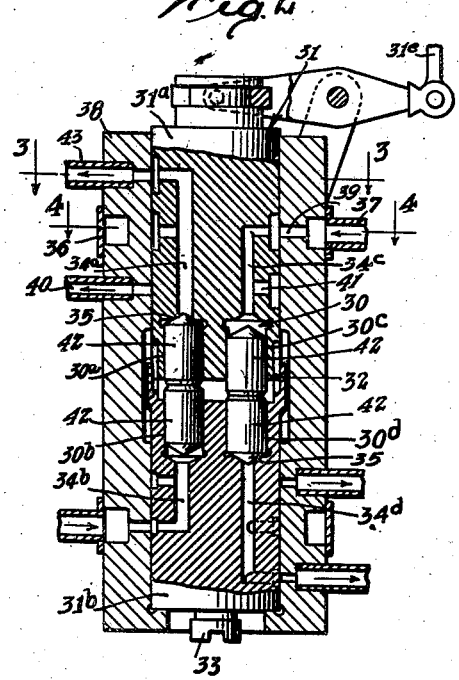
Fig. 2 is a view similar to Fig. 1, but illustrating another embodiment of the invention in which a plurality, such as four metering chambers, are employed, grouped around the axis of rotation in coaxial pairs.

Before proceeding to a more detailed description of the invention, it should be stated that in the following specification I have disclosed several different means for effecting the simultaneous control of capacity of all of the metering chambers. In Figs. 1 and 2 I employ the expedient of forming the rotor in separated sections which are rotated in unison, the adjacent ends of the rotor sections being provided with the measuring chambers cooperating with the movable means, for example, plungers are provided which move to and fro in their respective measuring chambers, the movement of each plunger in filling its metering chamber, operating to effect the return of its abutting plunger. The effective capacity of the measuring chambers is controlled by regulating the distance between the two rotor sections.

Although this is preferably accomplished by maintaining one of the rotor sections to rotate in a fixed plane, and shifting the other rotor section toward or from it, it is evident that this effect can be accomplished by a relative axial movement of the rotor and a stop associated with the rotor for limiting the movement of the plungers in their metering chambers. This is illustrated in Fig. 6.

Figure 5:
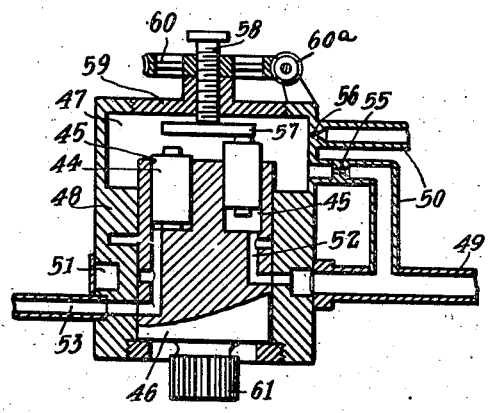
Fig. 5 is also a vertical section through a device embodying my invention, in which a plurality of metering chambers are employed, the individuals of which are disposed out of line with the axis of rotation of the rotor in which the metering chambers are formed. This view illustrates another means for controlling the capacity of the metering chambers.

The invention may be practiced, however, without necessitating the use of two separate sections for the rotor, but providing a plurality of metering chambers in the rotor, with common means for limiting the movement of their plungers. This is illustrated in Fig. 5.

Referring particularly to Figs. 1 and 2, in practicing the invention I provide a rotor 1 which is preferably composed of two rotor sections 1a and 1b that are coaxial with each other and mounted for simultaneous rotation in a stator 2. In other words, the rotor is mounted for rotation in a bore 3 that extends into the stator from its upper end, the rotor section 1b being supported at its lower end on an annular shoulder 4 at the lower end of the bore 3. The rotor sections are rotated simultaneously, and are maintained so that they always have the same oriented position with respect to each other. This is preferably accomplished by providing a driving coupling connection 5 at the lower end of the section 1b, and by providing a sliding driving connection between the adjacent ends of the rotor sections, involving the use of one or more stems or bars 6 fixed in one of the rotor sections, with the outer end of each bar mounted to slide in a small socket 7 into which the bar 6 makes an accurate sliding fit.

Movable means preferably consisting of plunger means, is provided for effecting the filling and discharge of two metering chambers 8 and 9 which are formed as bores extending into the adjacent ends of the rotor sections, and in the present instance, these bores are located on the axis of the rotor. The movable means employed for effecting the filling and discharge of the metering chambers preferably consists of two plungers 10 and 11 mounted respectively, in the metering chambers. The adjacent ends of these plungers abut against each other, and in the operation of the device a filling of one of the metering chambers advances its plunger and causes it to return the opposite plunger. In order to accomplish this a plurality of ports are provided in the stator and rotor, which cooperate to admit the liquid alternately to the two metering chambers. In the present instance, I provide a pipe connection 12 through which the supply of liquid is admitted under pressure to a longitudinally disposed passage 13 in the stator that communicates at its ends with two inlet channels or grooves 14 and 15 that pass circumferentially around the outer side of the stator which is, of course, of cylindrical form. These inlet grooves or "fuel rings" are preferably formed by cutting into the wall to form the groove, and then covering each groove with a tight sealing band 16. The metering chambers are provided with admission ports 17 and 18 respectively, which extend radially in the rotor, and which are located in the same plane as the inlet rings or grooves 14 and 15; and in addition to this, the metering chambers are provided with outlet ports 19 and 20 respectively, which, in the present instance, are L-shaped, having inner portions coaxial with their corresponding metering chambers, and having lateral extensions disposed substantially radially and located in the same plane as radially disposed discharge ports or exhaust ports 21 and 22 respectively, with which they cooperate. The admission port for each metering chamber and its corresponding discharge port, may be located diametrically opposite to each other as indicated in Fig. 1, with no intermediate ports. This would be an arrangement adapted for a relatively slow speed engine employing fuel distributed to it from this device. In any case, of course where the device is being employed to feed liquid fuel to an internal combustion engine such as a Diesel, semi-Diesel, or gasoline engine, the rotor would be driven in synchronism with the engine shaft so as to supply the fuel in metered or measured quantities to the cylinders in rotation. The device includes means for regulating the effective capacity of the metering chambers 8 and 9, and this is preferably accomplished by providing control means for regulating the distance between the two sections of the rotor. In other words, in accordance with my invention the two roller sections are made relatively movable to each other. In the present instance, I effect the regulation of the effective capacity of the metering chambers by shifting one of these rotor sections toward or from the other, but it is obvious of course, that if desired, both of the rotor sections could be made actually movable. In the present instance I provide for shifting the upper rotor section 1a by providing a slip collar or a swivel collar 23 engaging a reduced neck 24 on the upper end of the rotor section 1a. This swivel collar 23 may, if desired, be of U-shape with diametrically opposite forks that slide under the enlarged head 25 beyond the neck 24. This swivel collar 23 is preferably provided with pins 26 respectively, mounted in its forks and which are pivotally attached to the oppositely disposed forks of a control lever 27. This lever may be controlled by a link 28 connected to an operating lever (not illustrated) preferably associated with a quadrant for holding it in any desired position.

If desired, instead of having a single pair of cooperating inlet and outlet ports such as the ports 14a, and 15b, corresponding to each of the metering chambers, I may provide a plurality of pairs of such ports, locating each outlet port 60° or any other number of degrees according to the number of injection nozzles to be fed from the corresponding inlet port.

In the present instance, the plungers 10 and 11 are provided with projecting heads 29 which would limit the return movement of the plungers. These heads would also operate as valve seats. Instead of these heads, mere stops, as shown in Figs. 5 and 6, or valve rests as shown in Fig. 2, may be used.

Figure 4:
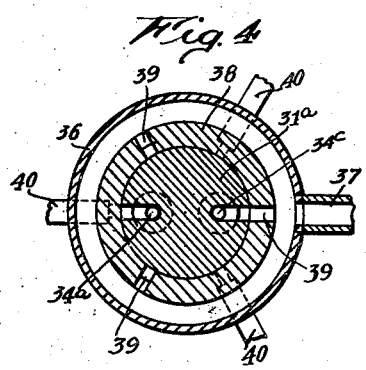
Fig. 4 is a similar section taken on the line 4—4 of Fig. 2.
Figure 3:
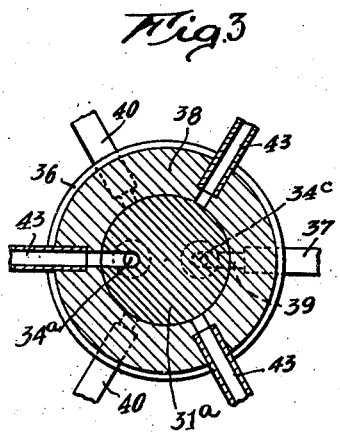
Fig. 3 is a horizontal section taken on the line 3—3 of Fig. 2.

In Figs. 2 to 4 I illustrate another embodiment of the invention in which I employ a plurality of metering chambers indicated generally by the reference numeral 30, and including two metering chambers 30a and 30b located off of the axis of the rotor 31; and a second pair of metering chambers 30c and 30d which are similarly located, but in a diametrically opposite position with respect to the axis of rotation of the rotor. In other words, in this type of construction I group the metering chambers symmetrically around the axis of rotation of the rotor, and while I have illustrated in these Figs. 2 to 4, only two such oppositely located pairs of metering chambers, it will be obvious that if desired, three or four such pairs of cylinders, or a greater number may be employed as desired. This type of construction is particularly adapted for supplying liquid fuel to an engine having a considerable number of cylinders.

The rotor 31 is composed of two relatively movable sections 31a and 31b, and as in the construction illustrated in Fig. 1, I prefer to control the effective capacity of the metering chambers by shifting the upper rotor section 31a up or down. In the present instance, I provide a multiple spline connection 32 for enabling the two rotor sections to be rotated in unison through a suitable coupling connection 33 that drives the lower rotor section 31b. In the present instance, the plungers abut directly against each other at their adjacent ends, and these plungers are illustrated as devoid of the heads 29 employed in Fig. 1. The port arrangement for admitting and exhausting the liquid under pressure from the metering chambers, somewhat resembles that illustrated in Fig. 1, and operates in such a way as to connect up one of the aligned metering chambers for admission of the liquid, while the other is connected up for exhaust so that when one of the plungers advances, it expels the metered liquid from the aligned and opposed metering chamber. In the present instance, the metering chamber 30a has a coaxial port or passage 34a, and corresponding ports 34b, 34c, and 34d, are provided for the other metering chambers. These ports 34a, 34b, 34c, and 34d, if desired, may be provided with conical counterbores 35, and the adjacent ends of the plungers made conical so as to enable the plungers to operate as valves when they come against these conical seats 35. This will reduce leakage past the plungers.

Referring to Fig. 4, the passages 34c and 34a are supplied with liquid under pressure from an inlet ring 36 supplied by an inlet connection 37. The stator 38 is formed with a plurality of radial inlet ports 39 which are located at the level of the upper end of the passage 34c. This passage 34c has a lateral extension at its upper end that connects up this port to the ports 39 in succession as the rotor rotates. In addition to this, the stator is provided with a plurality of exhaust ports corresponding to the inlet ports 39. These ports are indicated in Fig. 4, connected up to outlet exhaust connections 40, and these outlet connections 40 with their corresponding outlet ports, are located midway between the inlet ports 39. The port 34c has a lateral exhaust port 41 which is in line with all of the exhaust connections 40. The result of this is that when one of the plungers 42 is advanced in its filling stroke as indicated at the right in Fig. 2, it returns its corresponding plunger to expel the liquid in its corresponding metering chamber, it being understood that the port arrangement described above, is duplicated at the lower end of the device illustrated in Fig. 2. In the position illustrated in Fig. 2, the liquid under pressure has filled the metering chamber 30c and has expelled upon completing its stroke of expulsion all the liquid in the metering chamber 30d through the port 34d. This liquid is expelled from the port 34d in the manner indicated in the upper portion of Fig. 2, where the upper end of the port 34a is indicated as registering with an outlet connection 43. These outlet connections 43 are located directly over the outlet connections 40 already described. And when the rotor rotates through 30° from the position in which it is shown in Fig. 2, the port 41 will register with one of the exhaust ports 40 and enable the liquid in the metering chamber 30c to exhaust through the exhaust connection 40. The arrangement of ports described is illustrated also in Fig. 3.

In the structure shown in Figs. 1 to 4, inclusive, the confronting ends of the rotors define with the bore of the casing a chamber which is maintained at atmospheric pressure or a nominal pressure below that in the supply line so that any seepage around the plungers may be bled or drained away.

The effective capacity of the metering chambers is controlled by means of a control lever 31e mounted and arranged similarly to the corresponding lever 27 illustrated in Fig. 1.

In Fig. 5 I illustrate an embodiment of the invention in which I provide a plurality of plungers 44 that operate in metering chambers 45 that extend into the upper end of a rotor 46. The upper ends of these plungers move into a pressure chamber 47 formed in the upper end of the stator 48. The pressure in this pressure chamber is utilized to return the plungers and expel the metered liquid from their metering chambers. In this view 49 indicates the inlet connection, and pipe connections 50 are provided for admitting and releasing the liquid under pressure from the pressure chamber 47. Associated with these connections 50, I provide means for maintaining a pressure in the pressure chamber slightly below the operating pressure of the liquid that is admitted through the connection 49 to the inlet ring 51. The port arrangement for admitting the liquid to the two metering chambers 45, is substantially the same as that illustrated in Fig. 2, that is to say, each metering chamber is served by a port 52, one part of which is in alignment with the inlet ring 51, and another part of which is in alignment with exhaust connections such as the exhaust connection 53. In other words, as the rotor rotates in the stator 54, the liquid is alternately admitted and discharged from the metering chambers. The return of each plunger is effected through the agency of the pressure existing in the pressure chamber 47. Any suitable means may be provided for maintaining this pressure slightly reduced below the operating pressure. This could be accomplished by providing a relief valve in the outlet connection from the pressure chamber opening at a slightly lower pressure than the admission pressure for the liquid in the connection 49. In the present instance, however, I have illustrated a restricted, or choking, port 55 in the connection for admitting liquid into the chamber from the connection 49, and a similar choking port, or restricted port 56, in the outlet from the chamber.

In the present instance, the capacity of the metering chamber 45 is regulated by a common stop-head or stop disc 57 disposed over all of the plungers and in their path, so as to operate as a stop for them. This stop disc 57 can be adjusted up or down at will at all times by means of its supporting screw 58 which is guided through an unthreaded opening in the upper head 59 of the stator. A worm wheel 60 having a threaded hub turning on the upper end of this screw, can be rotated by its worm 60a to effect the adjustment.

The rotor is rotated in synchronism with the engine shaft, through the agency of a gear wheel or pinion 61 that extends down from the lower end of the rotor.

In Fig. 6 I illustrate an embodiment of the invention in which the rotor 62 is made in one piece, and provided with two coaxial metering chambers 63 and 64, with a partition or dividing wall 65 between them. The rotor is rotated at its lower end by means of the continuously driven gear wheel or pinion 66 which is supported in a fixed position on a shoulder 67 projecting under the same from the lower side of a gear 68 that drives this pinion. The pinion 66 is actually formed at the lower end of a plug-form stop 69 which has a pin-and-slot driving connection 70 to the rotor 62. The upper end of the plug 69 is formed with a reduced tip 71 upon which the lower plunger 72 rests at the bottom of its stroke, the said plunger reciprocating in the lower metering chamber while a similar plunger 73 reciprocates in the upper metering chamber, and the upward movement of this upper plunger is stopped by a movable plug 74, the lower end of which is provided with a reduced tip 75 against which the upper plunger impinges at the end of its up stroke. I provide means for shifting the plug 74 and the rotor axially with respect to each other. This may be accomplished by a mechanism which produces a differential movement between these two parts when the same is operated. In the present instance, this mechanism includes a lever 76 pivotally mounted on a fixed fulcrum 77 and provided with two connecting rods or links 78 and 79, the former of which is connected to a swivel ring or collar 80 fitting on a reduced neck 81 on the upper end of the rotor; and the latter of which is connected by a pivotal connection to the upper end of the plug 74.

The links 78 and 79 may, if desired, be mounted so that they incline in opposite directions. The link 79 is attached on the lever 76 at a further distance from the fulcrum 77 of the lever, so that the motion imparted to the plug 74 will be greater than that imparted to the rotor. This differential movement will result in a change in the effective capacity of the metering chambers 63 and 64.

Any suitable means may be provided for admitting the liquid under pressure and exhausting the same from the metering chambers. The two plungers 69 and 73, however, operate independently of each other except, of course, as to the timing of the moments of filling and discharging the liquid from the two chambers. For this purpose the stator 82 is provided with an inlet ring 83 that extends around the outer surface of the stator, and the rotor is provided with a radial inclined admission port 84 which periodically in its rotation, registers with a radial inlet port 85 in the wall of the stator leading in from the ring 83. This would admit liquid to one side of the plunger 73 and force it upwardly to expel the liquid in the chamber 63 above this plunger. This liquid would exhaust through a radial exhaust port 86 in the rotor, registering with an exhaust port 87 with a suitable exhaust pipe connection. The plunger 73 is returned in its downward movement, by a second inclined port 88 similar to the port 84 but serving the upper end of the metering chamber 63, and this port supplies liquid to the upper end of the chamber when its outer end registers with the port 85, or any one of the plurality of such ports disposed around the circumference of the stator. The port arrangement for the lower end of the device for controlling the plunger 72, is the same as that described in connection with the operation of the upper plunger 73, and therefore will not be described in detail, although the same is illustrated in the drawings. In other words, the lower end of the stator is provided with an inlet groove or ring 89, and the stator has an inlet port 90 which is inclined, the outer end of which may register with a radial inlet port such as the port 91, to admit the liquid to the lower end of the chamber 64. However, in Fig. 6 the rotor is shown in an oriented position in which the inclined admission port 92 is in its open position as it would be in admitting liquid to the upper end of the chamber 64; and the plunger 72 is indicated in its lowest position, at which time the liquid below it would be expelling or exhausting through the registering exhaust ports 93 and 94 formed respectively, in the rotor and the stator. Any other angular relation between the ports of the plurality of metering chambers is possible in practicing my invention.

In practice, the end of the lever 76 will be connected to a link 95, which would be controlled by means of an operating lever and quadrant (not illustrated).

Many other embodiments of the invention may be resorted to without departing from the spirit of the invention.

What I claim is:

1. In a liquid metering and distributing device, the combination of a stator, a rotor rotatably mounted therein and having a plurality of metering chambers therein, movable means associated with the metering chambers, capable of moving in one direction during the filling movement of the metering chamber and in the other direction during its discharging movement, said stator and said rotor having ports cooperating as the rotor rotates, to admit the liquid under pressure to said metering chambers, to advance said movable means and fill the metering chambers to their effective capacity, means for effecting the return of the movable means, and means for adjustably controlling the effective capacity of the metering chambers said rotor being composed of two separate sections capable of relative axial movement, and said adjustable controlling means being constructed so that it can operate while the rotor is rotating to effect relative axial movement of the two sections of the rotor for altering the effective capacity of the metering chambers.

2. In a liquid metering and distributing device, the combination of a stator, a rotor rotatably mounted in the stator and having two relatively movable sections with pairs of aligning bores extending into the same from their adjacent ends, plungers located respectively in said bores, each of said plungers capable of engaging its corresponding aligning plunger in the other section of the rotor, said stator and said rotor having ports cooperating during the rotation of the rotor to admit the liquid under pressure alternately to the remote ends of each pair of metering chambers to advance their plungers and fill the metering chambers, to their effective capacities, each plunger as it is advanced, operating to engage its corresponding aligned plunger to give the same its return stroke and expel the liquid from its corresponding metering chamber, means for effecting the rotation of said rotor sections in unison, and means for shifting the sections of said rotor relatively to each other to vary the capacity of the said metering chambers; said stator and said rotor having cooperating exhaust ports for leading off the liquid as it is discharged from the said metering chambers.

3. A liquid metering and distributing device constructed as defined in claim 2, in which one of the said rotor sections is maintained to rotate in a fixed plane, and means is associated with the other rotor section for moving the same toward or from the other rotor section.

4. In a liquid metering and distributing device, the combination of a stator having a bore therein, a rotor rotatably mounted in the said bore and having two relatively movable sections with opposed aligning bores extending into the same from their adjacent ends, a plunger located in each of said bores, each of said plungers capable of engaging the adjacent end of its opposite plunger, means for effecting the rotation of both sections of the rotor in unison with each other, said stator and said rotor having ports cooperating during rotation of the rotor to admit the liquid under pressure alternately to the remote end of each metering bore to advance its plunger in its filling movement, and cooperating in the discharging movement to enable each plunger to push its aligned plunger to expel the liquid before it, said rotor and stator having cooperating ports for leading off the liquid being discharged from the rotor; and means for shifting the sections of said rotor relatively to each other to vary the capacity of the said metering bores.

5. A liquid metering and distributing device comprising: a casing defining a bore, at least one delivery passage and a plurality of discharge passages, the delivery passages being in communication with a source of fuel under pressure; a rotor mounted in said bore and defining a plurality of axially directed sockets at one end of said rotor, and individual passages leading from said sockets to the periphery of said rotor, each for successive communication with at least one delivery passage and discharge passage as said rotor is rotated in said casing; a floating plunger reciprocable in each of said sockets; said plungers urged in a direction to expand said metering sockets when said sockets are in communication with said delivery passage; and means operable by fuel supplied from said source and effective when said metering sockets are in communication with said discharge passages for contracting said metering sockets; and means for varying in unison the effective strokes of said plungers.

6. A construction as set forth in claim 5, wherein the fuel passages in said rotor intersect the axially inner ends of said sockets and form therewith valve seats; and said plungers are provided with valve elements adapted to coact with said valve seats.

7. A liquid metering and distributing device comprising: a casing defining a cylindrical bore and also defining two axially spaced groups of passages intersecting said bore, each group including at least one delivery passage and a plurality of discharge passages; a pair of rotors mounted in said bore and connected for rotation in unison therein, and adapted to be moved axially to and from each other; said rotors having at least one pair of confronting sockets therein and passages communicating between said sockets and said groups of passages in said casing, and a floating plunger unit fitting each pair of sockets and each plunger unit defining with its sockets a pair of opposed metering chambers; and means for moving said rotors to and from each other to regulate the effective volumes of said metering chambers.

8. A liquid metering and distributing device comprising: a casing having a bore therein; a pair of rotors in said bore arranged end to end and capable of limited relative axial movement to vary their axial spacing; said rotors having at least a pair of aligned sockets in their confronting ends; floating plunger units fitting said sockets and defining therewith a pair of metering chambers; said casing and each rotor defining fuel ports cooperating during rotation to alternately admit liquid to and discharge liquid from said metering chambers; and means for adjusting the axial spacing of said rotors thereby to regulate the effective capacities of said metering chambers.

9. A construction as set forth in claim 8, wherein the fuel ports in said rotors intersect the axially inner ends of said sockets and form therewith valve seats; and said plunger units are provided with valve elements adapted to coact with said valve seats.

10. A construction as set forth in claim 8, wherein the confronting ends of said rotors define a drain chamber.

11. A liquid measuring and distributing device comprising: a sectional rotor having axially spaced sections capable of limited relative axial movement to vary their spacing and defining at least one pair of aligned sockets in their confronting ends; floating plungers reciprocable in said sockets and forming therewith metering chambers; a casing for said rotor sections; said casing and rotors defining coacting ports for moving fuel to and from said metering chambers; and means for varying the axial spacing of said rotor section thereby varying the effective capacity of said metering chambers.

HENRI MORGENROTH.